UNITED STATES PATENT OFFICE.

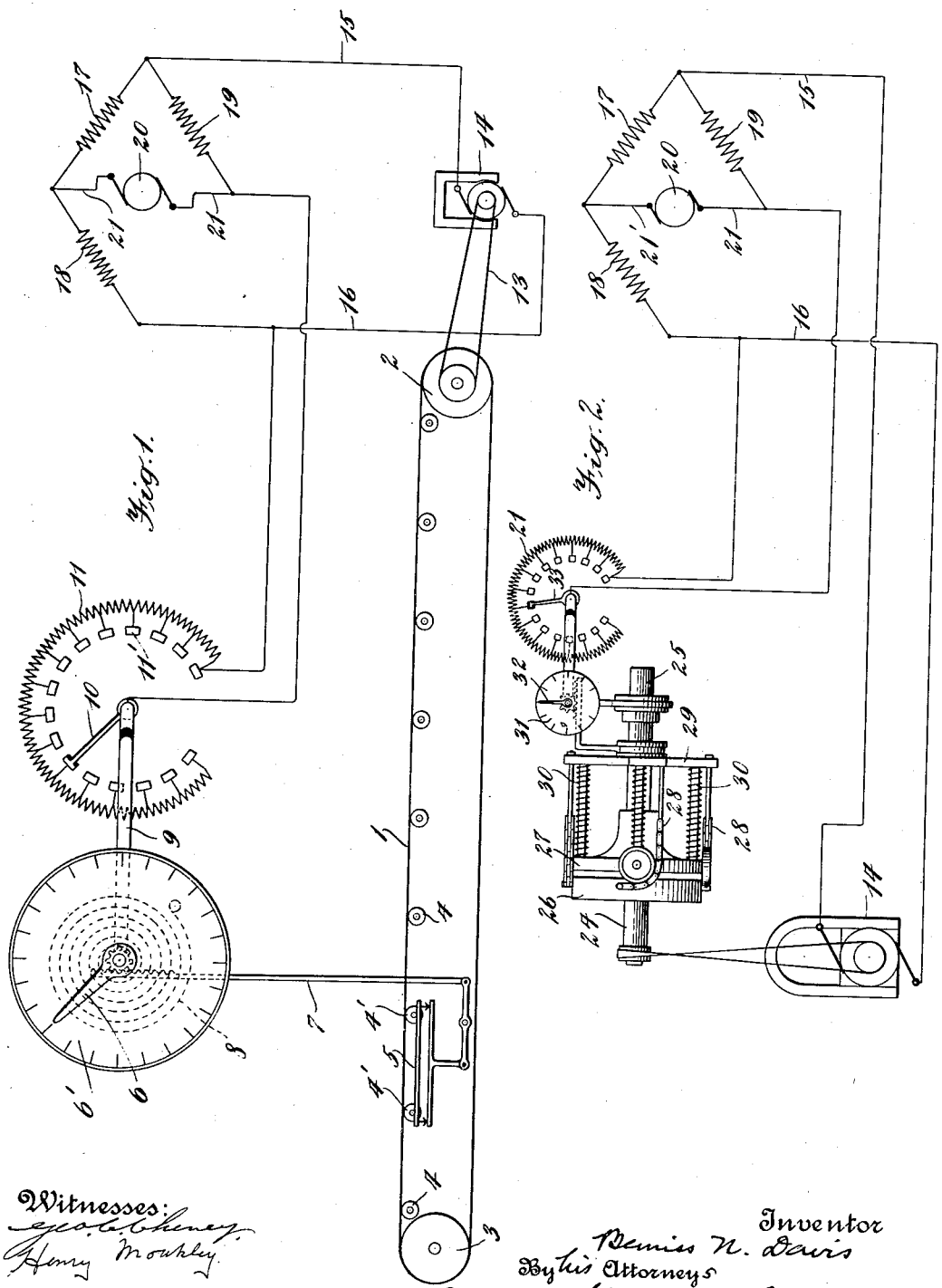

BEMISS N. DAVIS, OF NEW ORLEANS, LOUISIANA.

MEASURING INSTRUMENT.

1,298,302.

Specification of Letters Patent.  Patented Mar. 25, 1919.

Application filed March 27, 1914.  Serial No. 827,568.

*To all whom it may concern:*

Be it known that I, BEMISS N. DAVIS, a citizen of the United States, residing at the city of New Orleans, in the parish of Orleans and State of Louisiana, have invented certain new and useful Improvements in Measuring Instruments, of which the following is a full, clear, and exact description.

This invention relates to electrical measuring instruments and has for one of its purposes the provision of an instrument whereby the quantity or amount of material carried by an endless conveyer for any given period of time is automatically calculated and may be read from a direct reading scale. To carry out this purpose, my invention contemplates placing an electrical integrating meter in circuit with a dynamo-electric machine connected to a rotating part of the conveyer so that it will deliver current to the meter in direct proportion to the speed at which the conveyer is driven, and in providing means for varying the current which is supplied to the meter in proportion to the weight of the quantity of the material which passes over a given point at a given instant, which instantaneous values are integrated in the meter to give a reading indicating the total weight of the material carried by the conveyer.

The instrument is therefore preferably calibrated to read in bushels, tons or other units, depending upon the material carried by the conveyer.

The measuring instrument is not, however, limited to use as an automatically weighing device, but is capable of a broad application and adaptation to numerous and varied uses as will be apparent to one skilled in mechanical arts, and as an example of one of these adaptations, a modification is shown in which the instrument is operatively associated with a rotating shaft, where it may be used to give either a direct reading of the horse-power required to drive the shaft or the total horse-power-hours consumed in driving the shaft for any period of time.

Numerous other adaptations will be apparent to those skilled in the art and it is my intention that the invention be limited only by the scope of the claims appended hereto.

In the drawings:

Figure 1 is a diagrammatic view of an instrument constructed in accordance with and embodying the features of my invention, showing it adapted to be used as a belt conveyer weighing device.

Fig. 2 is a diagrammatic view of the same instrument operatively associated with a rotating shaft.

Referring first to Fig. 1, the numeral 1 designates broadly an endless belt conveyer of the ordinary construction which is adapted to carry materials such as wheat, coal and the like. This belt conveyer is driven by a pulley 2 over which the belt passes at one end, while at the other end, it passes over an idle pulley 3. The upper half of the belt which carries the material is supported by rollers or carriers 4, which are in turn supported in the frame of the carrier (not shown). Arranged beneath a portion of the upper part of the belt 1 is a scale platform 5, on which is mounted a plurality of carriers or supporting rollers 4' similar to the carriers 4 through which rollers the weight of the material carried by the belt conveyer is transmitted to the scale platform. A pivoted pointer or indicator 6 is moved over a scale 6' in direct proportion to the weight of the mass of material sustained by the scale platform 5, by means of any of the well-known forms of scale construction and in the drawings, the pointer and the scale are shown connected to a system of linkage 7 and a spiral spring 8 similar to that used in direct reading grocers' or butchers' weighing scales.

Preferably mounted on a shaft 9 which carries a pointer 6, is an arm 10 of a rheostat having resistance coils 11, the end of which coils are connected to a series of contacts 11'. The arm 10 carries at its outer end a blade or brush which is adapted to contact with the contacts 11' to cut the resistance coils in or out of circuit, the blade being of sufficient width that in the angular movement of the arm the blade will bridge the contacts 11', or, in other words, the arm 10 will be continually in electrical contact with one of the contacts 11'. These contacts are so spaced that for variations of a unit weight carried by the continuous conveyer one coil of the rheostat will either be cut in or out of circuit, the unit weight being chosen depending upon the material to be carried and may be either an ounce, a pound or other unit. While I have shown a rheostat controlled by an arm 10, it is to be understood that any form of current regulating device may be used which will control the current passing therethrough in proportion to the weight of the mass sustained by the scale platform.

In the diagrammatic view shown, a magneto 14 is connected to the driving pulley 2 by means of a belt 13 but it is to be understood that in the practical construction of the instrument some form of chain or gear drive would be used to avoid the slip which necessarily occurs in a belt drive. Instead of the magneto 14, any form of electric generator may be used in which the current varies in direct proportion to the speed. The armature coils of the magneto 14 or other form of generator should be wound with a wire having a zero temperature coefficient so that the strength of current generated thereby will not be affected by the temperature conditions under which the generator acts. The armature terminals of the magneto or generator 14 are connected by the wires 15 and 16 to the ends of a Wheatstone's bridge which consists of two branch circuits, one of which branches includes the resistances 17 and 18, while in the other branch a resistance 19, the coils 11 of the rheostat and its arm 10 are connected in series. Substituted for the galvanometer usually employed in a Wheatstone's bridge is an electrical meter 20 which is bridged between the two branch circuits by means of a conductor 21. If it is desired to record the amount of material carried by the conveyer for any given period of time which is the best practical construction, a recording integrating electrical meter is used.

The Wheatstone's bridge is preferably balanced when the resistance coils 11 of the rheostat are entirely cut into the circuit, in which position the arm 10 is in its lower left-hand position and the pointer 6 of the scale stands at its zero indicating position, the scale 6' being so calibrated that the pointer 6 indicates zero when there is no weight sustained by the scale platform 5 except the weight of the belt itself. The Wheatstone's bridge may also be balanced when the resistance coils 11 of the rheostat are entirely cut out of the circuit in which case it would be necessary to reverse the position of the arm 10 and the pointer 6, the construction in which this form is desirable being hereinafter referred to.

The operation in general is as follows:—
Assuming that the continuous conveyer is being driven at the desired speed but no material is carried by it, the Wheatstone's bridge is therefore in balanced condition and the current generated by the magneto or generator 14 passes through the balanced circuits and will not affect the meter 20.

As the material is fed onto the belt conveyer 1, its weight will be transmitted to the platform 5 and move the pointer 6 and the arm 10 of the rheostat in a clockwise direction which will successively cut out the resistance coils 11. The circuits of the bridge will therefore become unbalanced and a portion of the current generated by the generator 14 then passes through the electrical meter 20. The angular movement of the arm 10 is directly proportional to the weight sustained by the scale and since the current in any circuit varies in inverse proportion to the resistance of the circuit, the current which passes through the meter 20 will vary in proportion to the weight of the material which the scale platform carries. Again, the magneto or generator is designed so that the current generated is directly proportional to the speed of the generator and the current delivered to the two balanced circuits of the Wheatstone's bridge is proportional to the speed of the conveyer. The current which passes through the meter 20 therefore varies proportionally to the speed of the conveyer and also to the weight which it sustains and also in proportion to the product of these factors, i. e., the product of the mass, force and speed.

As instantaneous variations in the weight transmitted to the scale platform 5 will affect the current passing through the meter 20, it is unnecessary that the portion of the belt conveyer directly above the scale platform 5 be disconnected from the other portions of the belt conveyer, it being only essential that the weight of the material carried by the belt conveyer will be entirely transmitted to the scale platform 5 while in transit. This is due to the fact that instantaneous variations in the speed of the conveyer will also affect the current passing through the meter 20 to cause the operation of the meter in the same manner as if the material carried by the belt conveyer were regarded as passing over a given point in a given instant of time.

Where the instrument is utilized as an automatic weighing device to record the weight of the material carried by a continuous conveyer during a given period of time, a recording integrating electrical meter is used and in the form of the instrument shown the meter used would comprise an ampere hour meter of the usual design. Where such a meter is used it is necessary that the strength of current passing through the same be increased or decreased for corresponding increases or decreases in the number of units of weight carried by the belt conveyer, so that the speed of the movable member of the ampere hour meter will vary proportionately to the ratio which the weight of material transmitted to the scale platform 5 bears to the standard weight which the instrument is designed to carry. Because the current in 21 will not vary as the effective resistance of the series of coils 11, it is necessary that they, the coils, be proportioned of varying resistances and that these resistances be calculated separately so that the cutting in or out of any one coil will cause the same increase or decrease in the current in 21 irrespective of the position of the particular coil relative to the other coils of the series.

In calculating these resistances, there must be taken into consideration the resistance of the circuits of the instrument, the resistance of the magneto or other form of generator, and the ratio which the weight at which the particular coil will be cut out of circuit bears to the standard weight for which the instrument is designed.

Referring now to the modification disclosed in Fig. 2 of the drawings, the circuit connections are similar to those shown in Fig. 1, but the resistance coils 21 which form a part of one of the balanced circuits of the Wheatstone's bridge, are adapted to be cut in or out of circuit by means of a dynamometer which measures the energy required to drive a shaft 24. Any known form of dynamometer may be used and in the drawing, a Neer's rotary transmitting dynamometer is shown. This dynamometer is connected between the driven shaft 24 and a driving shaft 25, and comprises disks 26 and 27 which are keyed to the shafts 24 and 25, respectively. Chains 28 anchored to the disk 26 pass over pulleys carried by the disk 27 and are connected to a spider 29 which is keyed to but slidably mounted on the shaft 25. The pull of the chains 28 is resisted by the tension of the springs 30 which tension is recorded on a dial 31 by means of an annularly moving pointer 32. Mounted on the shaft of the pointer 32 is an arm 33 which, similar to the form disclosed in Fig. 1, is adapted to cut out the resistance 21 which forms a part of the circuit in the Wheatstone's bridge. The generator 14 is driven either from shaft 24 or 25.

When the driving shaft 25 transmits its power to the driven shaft 24, the dynamometer will move the indicating pointer 32 in direct proportion to the energy required to rotate the driven shaft and the arm 33 when the shafts are running light or at rest is preferably so arranged that all of the resistance coils 21 are cut into circuit. Under load, the arm 33 will be rotated in a clockwise direction to cut out sections of the rheostat 21 in direct proportion to the power required to drive the driven shaft. Since the magneto 14 is connected to the driving shaft 24, the strength of current passing through the Wheatstone's bridge will therefore be in direct proportion to the speed. Assuming that a meter is bridged between the balanced circuits of the Wheatstone's bridge, since the strength of current which affects this ammeter is directly proportional to the speed of the rotating shafts and also to the energy required to drive them, (it being necessary, of course, for the latter condition that the coils 21 be properly proportioned as previously set forth) the deflections or movements of the meter will be directly proportional to the product of these factors. The work done in driving the shafts multiplied by the speed with which the force acts, i, e., rate of doing work, will give the power required to drive the shaft and the instrument may be calibrated to read in horse-power or in any other unit. If it is not desired that the angular deflection of the ammeter's needle be in direct proportion to power required to drive the shaft, the coils 21 may be made of equal resistance, in which case the needle deflections produced by predetermined powers must be marked on the scale of the ammeter and the instrument thus calibrated.

If it is desired to determine the horse-power-hours or the amount of power consumed in driving the shaft for any predetermined period of time, the meter 20 may be replaced by an integrating hour meter which will record these instantaneous values and thus give the sum or total at a single reading.

Where the instrument is used to indicate the horsepower and for various other uses, it is frequently desirable that the instrument indicate the instantaneous values of the product of the mass, force and speed of the movable body rather than the sum or total of the instantaneous values of these products. In this instance, a direct reading electrical meter of the ordinary type may be used. If an ammeter is used, it is obvious that with each additional unit defining the product of the mass and force, there should be a corresponding increase in the strength of the current that passes through the ammeter. The Wheatstone's bridge is, therefore, balanced with the resistance coils 11 or 21 entirely cut in circuit as in the form disclosed, which coils may be of equal resistance if desired. The ammeter may be calibrated as the variations in the strength of current produced by cutting in or out successive resistance coils 11 or 21 will produce determined deflections of the movable needle of the ammeter, the respective positions of which may be marked on the dial so as to be read in the desired units.

The instrument may also be designed so that a voltmeter may be used as the direct reading instrument and here it is necessary that for each additional unit corresponding to the product of the mass and force of the body there should be a corresponding increase in the voltage of the current passing through the voltmeter which will give instantaneous readings of the increase in the units of the product of the mass and force.

The Wheatstone's bridge would, in this instance, be balanced when the resistance coils 11 or 21 are cut out of circuit so that as the coils 11 or 21 are successively cut in by the angular advance of the arm 10 or its equivalent which will be in a reverse position to that shown as has been referred to. When the instantaneous readings are desired, the resistance coils 11 or 21 may be of equal resistances since the variations in voltage produced by cutting in or cutting out successive resistance coils produce a determined deflection or movement of the needle of the voltmeter, the respective positions of which may be marked on the dial so that the instrument will give a direct reading in the required units. If a recording integrating instrument is used, the resistance coils 11 or 21 should be of varying resistance which may be calculated in the manner heretofore described.

It will therefore be seen that the instrument has a peculiar adaptation where it is desired to determine the work done or consumed in driving a moving body and the invention may be applied in numerous ways to moving bodies other than on rotating shafts.

It will also be seen that the instrument has special adaptations where it is desired to place one or more direct reading instruments in the same circuit which may be located at different localities or at positions remote from the weigher or other devices with which the instrument is connected as, for example, the direct reading instrument may be placed in the operating company's office at any distance from the continuous weigher to which it is connected.

I claim:—

1. An automatic weighing device for continuous conveyers comprising a scale for weighing the material carried by the conveyer as it passes a given point, an electrical meter, a circuit having two normally balanced branches connected to said meter so as to unaffect it while said branches are balanced, a dynamo-electric machine driven at a speed proportionate to the speed of the conveyer and generating a current in direct proportion to its own speed, and means controlled by said scale for varying the current in one of said branches and unbalancing said branches whereby a current will flow through said meter.

2. An automatic weighing device for continuous conveyers comprising a Wheatstone's bridge, an electrical integrating meter connected between the legs of said bridge, means in one leg of the bridge controlled by the weight of the material carried by the conveyer at a given point for varying the current therein and a dynamo-electric machine driven proportionately to the speed of the conveyer and generating a current in direct proportion to its own speed for supplying current to said bridge.

In witness whereof, I subscribe my signature, in the presence of two witnesses.

BEMISS N. DAVIS.

Witnesses:
A. C. DUCATEL,
WILLIAM A. DIXON.